United States Patent [19]

Valle

[11] Patent Number: 4,828,624

[45] Date of Patent: May 9, 1989

[54] CEMENT GRINDING AID COMPOSITIONS

[75] Inventor: Jaime Valle, Naperville, Ill.

[73] Assignee: Nalco Chemical Company, Naperville, Ill.

[21] Appl. No.: 81,927

[22] Filed: Aug. 5, 1987 (Under 37 CFR 1.47)

[30] Foreign Application Priority Data

Oct. 28, 1986 [AU] Australia .................. 64474/86

[51] Int. Cl.$^4$ .................................. C04B 24/00
[52] U.S. Cl. .................................. 106/90; 106/102; 106/314
[58] Field of Search ................ 106/70, 102, 314

[56] References Cited

U.S. PATENT DOCUMENTS

| | | | |
|---|---|---|---|
| 3,420,686 | 1/1969 | Serafin | 106/90 |
| 3,420,687 | 1/1969 | Serafin | 106/102 |
| 3,865,601 | 2/1975 | Serafin et al. | 106/102 |
| 4,375,987 | 3/1983 | Lange et al. | 106/95 |

OTHER PUBLICATIONS

CA 101 (22): 197089u.
CA 100 (26): 214564u.
CA 99 (18): 145071c.
CA 98 (14): 112672a.
CA 97 (16): 132435h.
CA 96 (2): 10867j.
CA 95 (26): 224404j.
CA 94 (16): 126393q.
CA 93 (14): 136935m.
CA 92 (6): 46425v.
CA 92 (6): 46339v.
CA 91 (24): 197785t.
CA 91 (6): 43629h.
CA 89 (2): 10915d.
CA 88 (12): 78040z.
CA 84 (14): 94610h. 34 CA 84 (4): 21461a.
CA 84 (4): 21460z.
CA 83 (16): 136330d.
CA 82 (16): 102403u.
CA 80 (16): 86847t.
CA 70 (18): 80618r.

*Primary Examiner*—William R. Dixon, Jr.
*Assistant Examiner*—Karl Group
*Attorney, Agent, or Firm*—John G. Premo; Anthony L. Cupoli; Donald G. Epple

[57] ABSTRACT

Cement clinkers are ground in an aqueous environment using as a grinding aid, a composition comprising:

| Ingredients | Percent by Weight |
|---|---|
| A water-soluble glycol | 40-70 |
| Urea as a 50% aqueous solution | 60-30 |

3 Claims, No Drawings

CEMENT GRINDING AID COMPOSITIONS

INTRODUCTION

The invention involves a method of enhancing grinding efficiency of cement clinker and reducing the pack set tendencies of finished cement, using an improved grinding additive. Grinding efficiency is improved in that the desired fineness of the finished cement can be achieved with fewer mill revolutions, e.g. less grinding energy. The additive also reduces the Pack Set Index of the finished cement, an indicator of the tendency of the dry cement to compact and become non-flowing.

ADVANTAGES OF THE INVENTION

Cement grinding aids have been used for many years, and it is estimated that U.S. consumption of such chemicals is currently 30–40 million pounds per year. Most commercial grinding aids are either waste streams of ethylene glycol or diethylene glycol, or a combination of a glycol and an amine acetate (monoethanolamine, diethanol and triethanol amines, etc). Also known are combinations of a glycol and aromatic acetates, fatty acid salts, etc.

The subject invention can be shown to be more cost-effective than existing formulations. The formulations of the invention are excellent grinding aids, and also have a pronounced positive effect on pack setting tendencies in the finished cement.

PRIOR ART

The art in this area shows two pertinent points:
a. Glycols have been used for years as cement grinding aids, alone or with other additives.
b. U.S. Pat. No. 3,420,686 teaches that urea is an effective grinding aid and pack set inhibitor.

THE INVENTION

The invention is based on the combination of two components which individually have been shown to be effective grinding aids. Specifically the invention comprises utilizing as a grinding agent an aqueous solution of a composition comprising:

| Ingredients | Percent by Weight |
| --- | --- |
| A water-soluble glycol | 40–70 |
| Urea as a 50% aqueous solution | 60–30 |

In a preferred embodiment of the invention the preferred glycol component is diethylene glycol although other glycols may be substituted therefore such as ethylene glycol, propylene glycol, dipropylene glycol, and the like. The criteria for the glycol component is that it contain at least two hydroxyl groups and that it be water soluble. A preferred composition uses diethylene glycol to provide 50% by weight thereof.

While urea in the form of a 50% solution is preferred, other related compounds may be substituted therfore such as acetyl urea or diacetyl urea.

The compositions of the invention may be applied in a dosage rage of 0.01–0.07% by weight of the clinkers. A convenient dosage range is 0.2–0.8 lbs. per ton of clinkers treated. The compositions are most effective when they are diluted to provide about 5–10 parts water to one part of compositions.

To illustrate the invention, the following compositions are set forth below:

| Compositions | Weight % Diethylene Glycol | Weight 50% Aqueous Urea |
| --- | --- | --- |
| 1 | 40.0 | 60.0 |
| 2 | 50.0 | 50.0 |
| 3 | 60.0 | 40.0 |
| 4 | 70.0 | 30.0 |

The preferred composition is Composition 2.

EXAMPLE 1

Below is a laboratory test. It shows cement test results following intergrinding of clinker with gypsum and grinding aid (gypsum—4% by weight; grinding aid—0.01% by weight). All additions were dosed at a levl of 0.01% by weight to the cement clinker:

| Grinding Aid | Specific Surface, $cm^2/g$ after 6000 revs | 8000 revs | Pack Set Index, Average of Five Measurements |
| --- | --- | --- | --- |
| None | 3270 | 3750 | 13.0 |
| Composition 4 | 3250 | 3820 | 10.0 |
| Composition 3 | 3440 | 3970 | 6.4 |
| Composition 2 | 3400 | 4030 | 6.4 |
| Composition 1 | 3340 | 3750 | 9.4 |
| Commercial Grinding Aid #1 | 3400 | 3810 | 8.0 |
| Commercial Grinding Aid #2 | 3470 | 3980 | 6.8 |

EXAMPLE 2

The combination of aqueous glycol and urea appears to demonstrate some synergism, in that the blends provide activity that is better than equal dosages of the individual glycol or urea components. The following data typifies this behavior:

| Composition | Dosage Applied to the Cement Clinker | Blaine $(cm^2/g)$ |
| --- | --- | --- |
| (None) | (None) | 3510 |
| Composition 2 50% Diethylene glycol 25% Urea 25% Water | 0.02% 0.04% 0.06% | 3740 3860 3920 |
| 50.0% Urea 50.0% Water | 0.02% 0.04% | 3650 3570 |
| 100% Diethylene glycol | 0.02% 0.04% | 3800 3630 |

As the above examples clearly show, Composition 2 results in a finer grind, larger Blaine number, then either the glycol or urea component individually. The urea/water mixture alone provided very little, if any, enhanced grinding, while straight glycol showed erratic behavior due to clumping of the cement in the grinding mill. The combination produced both finer grinds and more free flowing cement in the mill.

EXAMPLE 3

To further illustrate the effectiveness of the invention, the following are presented by way of example and represent the results of actual mill runs in operating cement plants:

TABLE I

Effect of Composition 2 on Pack-set and fineness of Portland Cements

| | Blaine $CM^2/g$ | Pack-set |
|---|---|---|
| Type I Cement | | |
| .020% Standard Additive | 3820 | 8 |
| .020% Composition 2 | 3800 | 6 |
| Type II Cement | | |
| .020% Standard Additive | 3590 | 7 |
| .020% Composition 2 | 3600 | 8 |

Having thus described the invention, it is claimed as follows:

1. An improved method of grinding cement clinkers wherein the clinkers are ground in an aqueous environment, the improvement which comprises using as a grinding aid a composition comprising:

| Ingredients | Percent by Weight |
|---|---|
| A water-soluble glycol | 40–70 |
| Urea as a 50% aqueous solution | 60–30 |

2. The improved method of claim 1 wherein the water-soluble glycol is diethylene glycol.

3. The improved method of claim 2 wherein the diethylene glycol is present at 50% by weight.

* * * * *